US010023075B2

(12) United States Patent
Gage

(10) Patent No.: US 10,023,075 B2
(45) Date of Patent: Jul. 17, 2018

(54) AUTOMATICALLY ADJUSTING VEHICLE SEAT BACK SUPPORTS OF VEHICLE SEAT ASSEMBLIES

(71) Applicant: Toyota Motor Engineering & Manufacturing North America, Inc., Erlanger, KY (US)

(72) Inventor: Sergei I. Gage, Redord, MI (US)

(73) Assignee: Toyota Motor Engineering & Manufacturing North America, Inc, Plano, TX (US)

( * ) Notice: Subject to any disclaimer, the term of this patent is extended or adjusted under 35 U.S.C. 154(b) by 43 days.

(21) Appl. No.: 15/185,148

(22) Filed: Jun. 17, 2016

(65) Prior Publication Data

US 2017/0361733 A1  Dec. 21, 2017

(51) Int. Cl.
*B60N 2/02* (2006.01)
*B60N 2/00* (2006.01)
*B60N 2/22* (2006.01)

(52) U.S. Cl.
CPC .......... *B60N 2/0248* (2013.01); *B60N 2/002* (2013.01); *B60N 2/22* (2013.01); *B60N 2002/0268* (2013.01)

(58) Field of Classification Search
None
See application file for complete search history.

(56) References Cited

U.S. PATENT DOCUMENTS

| 4,401,928 | A | 8/1983 | Kamijo |
| 5,822,707 | A | 8/1998 | Breed et al. |
| 5,975,637 | A | 11/1999 | Geuss et al. |
| 6,042,145 | A | 3/2000 | Mitschelen |
| 6,088,643 | A | 7/2000 | Long et al. |
| 7,172,247 | B2 | 2/2007 | Beloch |
| 7,393,054 | B2 | 7/2008 | McQueen et al. |
| 7,543,888 | B2 * | 6/2009 | Kuno ................... B60N 2/0232 297/353 |
| 7,654,614 | B2 | 2/2010 | Schubler et al. |
| 7,703,847 | B2 | 4/2010 | Szablewski |
| 8,275,514 | B2 * | 9/2012 | Hwang ............... B60N 2/4415 297/284.6 |

(Continued)

*Primary Examiner* — Mussa A Shaawat
*Assistant Examiner* — Abdhesh K Jha
(74) *Attorney, Agent, or Firm* — Dinsmore & Shohl LLP

(57) ABSTRACT

A vehicle includes a vehicle seat comprising a seat base structure and a seat back structure pivotally connected to the seat base structure. The seat back structure includes a central adjustable region, an inboard side adjustable region adjacent the central adjustable region and a outboard side adjustable region located adjacent the central adjustable region. The seat back structure includes a central proximity sensor located at the central adjustable region, an inboard side proximity sensor located at the inboard side adjustable region and an outboard side proximity sensor located at the outboard side adjustable region. A seat back structure adjustment apparatus includes a central region adjustable member that adjusts a configuration of the central adjustable region, an inboard side adjustable member that adjusts a configuration of the inboard side adjustable region and an outboard side adjustable member that adjusts a configuration of the outboard adjustable region.

15 Claims, 5 Drawing Sheets

(56) References Cited

U.S. PATENT DOCUMENTS

| | | | |
|---|---|---|---|
| 2007/0225624 A1* | 9/2007 | Tsukada | A61H 15/0078 601/49 |
| 2009/0002184 A1* | 1/2009 | Lenneman | B60R 16/0373 340/665 |
| 2010/0049407 A1* | 2/2010 | Hijikata | B60N 2/0224 701/46 |
| 2012/0086249 A1* | 4/2012 | Hotary | B60N 2/0228 297/284.3 |

* cited by examiner

AUTOMATICALLY ADJUSTING VEHICLE SEAT BACK SUPPORTS OF VEHICLE SEAT ASSEMBLIES

TECHNICAL FIELD

The present specification generally relates to vehicle seat assemblies and, more specifically, to vehicle seat assemblies including automatically adjusting vehicle seat back supports.

BACKGROUND

Vehicle seat assemblies are commonly used in vehicles to accommodate one or more occupants of the vehicles. The vehicle seat assemblies may include a number of adjustable features including forward and back position and seat back position. In some vehicles, these adjustable features may be power controlled by the operator, for example, using a switch. Even some vehicle seat assemblies include seat heaters or ventilation. However, the adjustable features may be somewhat limited and require operator control.

Accordingly, a need exists for vehicles, systems and methods that provide automatically adjusting vehicle seat back supports.

SUMMARY

In one embodiment, a vehicle includes a vehicle seat comprising a seat base structure and a seat back structure pivotally connected to the seat base structure. The seat back structure includes a central adjustable region, an inboard side adjustable region adjacent the central adjustable region and a outboard side adjustable region located adjacent the central adjustable region. The seat back structure includes a central proximity sensor located at the central adjustable region, an inboard side proximity sensor located at the inboard side adjustable region and an outboard side proximity sensor located at the outboard side adjustable region. A seat ECU receives signals from the central proximity sensor, the inboard side proximity sensor and the outboard side proximity sensor that are indicative of respective occupant back locations with an occupant sitting in the vehicle seat. A seat back structure adjustment apparatus includes a central region adjustable member that adjusts a configuration of the central adjustable region, an inboard side adjustable member that adjusts a configuration of the inboard side adjustable region and an outboard side adjustable member that adjusts a configuration of the outboard adjustable region. The seat ECU includes logic for controlling an actuator that moves one or more of the central region adjustable member, the inboard side adjustable member and the outboard side adjustable member based on one or more signals from the central proximity sensor, the inboard side proximity sensor and the outboard side proximity sensor.

In another embodiment, a method of automatically adjusting a seat back structure of a vehicle seat is provided. The method includes detecting occupant back locations using an inboard proximity sensor, an outboard proximity sensor and a central proximity sensor provided on the seat back structure of the vehicle seat. The sensors provide one or more signals indicative of the occupant back locations to a seat ECU. The seat ECU determines if the occupant back locations are within one or more predetermined distances. The seat ECU adjusts a configuration of at least one of a central adjustable region, an inboard side adjustable region and an outboard side adjustable region of the seat back structure by moving at least one of a central region adjustable member, an inboard side adjustable member and an outboard side adjustable member using an actuator based on the one or more signals from the central proximity sensor, the inboard proximity sensor and the outboard proximity sensor and the one or more predetermined distances.

In yet another embodiment, a vehicle seat assembly includes a vehicle seat including a seat base structure and a seat back structure pivotally connected to the seat base structure. The seat back structure includes a central adjustable region, an inboard side adjustable region adjacent the central adjustable region and a outboard side adjustable region located adjacent the central adjustable region. The seat back structure includes a central proximity sensor located at the central adjustable region, an inboard side proximity sensor located at the inboard side adjustable region and an outboard side proximity sensor located at the outboard side adjustable region. A seat back structure adjustment apparatus is located in the seat back structure including a central region adjustable member that adjusts a configuration of the central adjustable region, an inboard side adjustable member that adjusts a configuration of the inboard side adjustable region and an outboard side adjustable member that adjusts a configuration of the outboard adjustable region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles, systems and methods that provide automatically adjusting vehicle seat back supports. The vehicles include an occupant support system that includes a vehicle seat assembly that utilizes a seat electronic control unit (ECU) and a number of proximity sensors that are located at various positions on a vehicle seat. The proximity sensors can provide signals to the seat control unit indicative of positions of a variety of occupant back locations when sitting in the vehicle seat. The seat ECU can control a vehicle seat support assembly that can adjust support positions of the vehicle seat using seat actuators based on the signals from the proximity sensors. Such adjustments of the vehicle seat support assembly can be performed automatically and/or on demand based on an operator setting.

Figure 1:
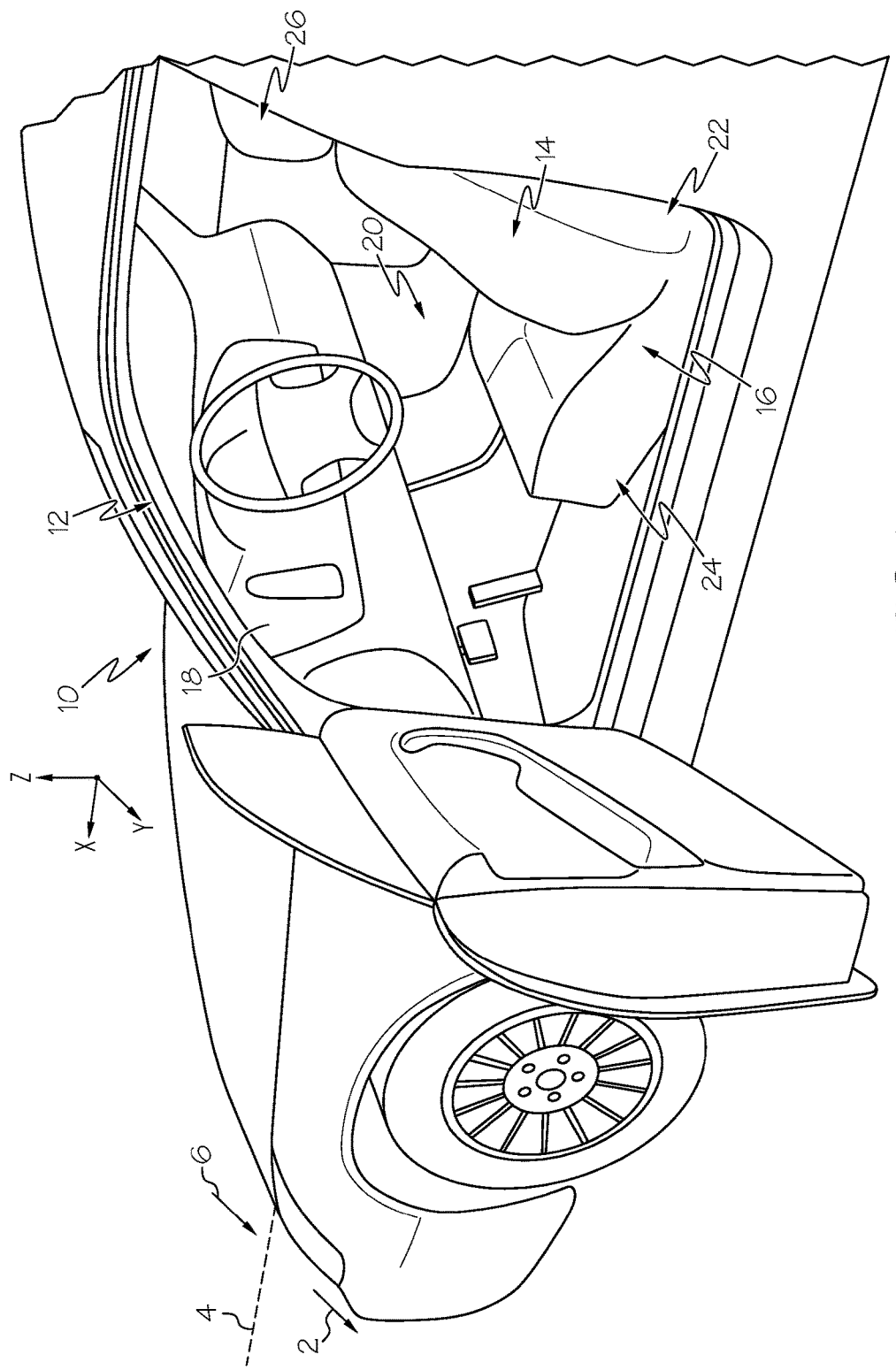
FIG. 1 is a side partial view of a vehicle including an occupant support system, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

In FIG. 1, selected portions of a vehicle 10 are illustrated. The vehicle 10 generally includes a vehicle body 12 with a vehicle seat assembly 14 located therein including a vehicle seat 16 located rearward of an instrument panel 18 within an occupant seating area 20. The vehicle seat 16 includes a seat back structure 22 and a seat base structure 24. In some embodiments, the seat back structure 22 may move (e.g., rotate or pivot) relative to the seat base structure 24 to a variety of angular position relative thereto and be releasably locked into place at a desired location via manual and/or automatic operation. A headrest 26 may be provided on the seat back structure 22. The headrest 26 may be adjustable to a variety of positions in the vehicle vertical direction relative to the seat back structure 22 and be releasably locked into place at a desired location via manual and/or automatic operation. While the vehicle seat 16 is illustrated as a driver vehicle seat, the vehicle seat may be provided at other occupant positions, such as one or more front and/or rear passenger seats. Further, while the vehicle seat assembly 14 is illustrated in a car, other automobiles, buses, planes, watercraft, etc. may utilize the vehicle seat assembly 14.

Figure 2:
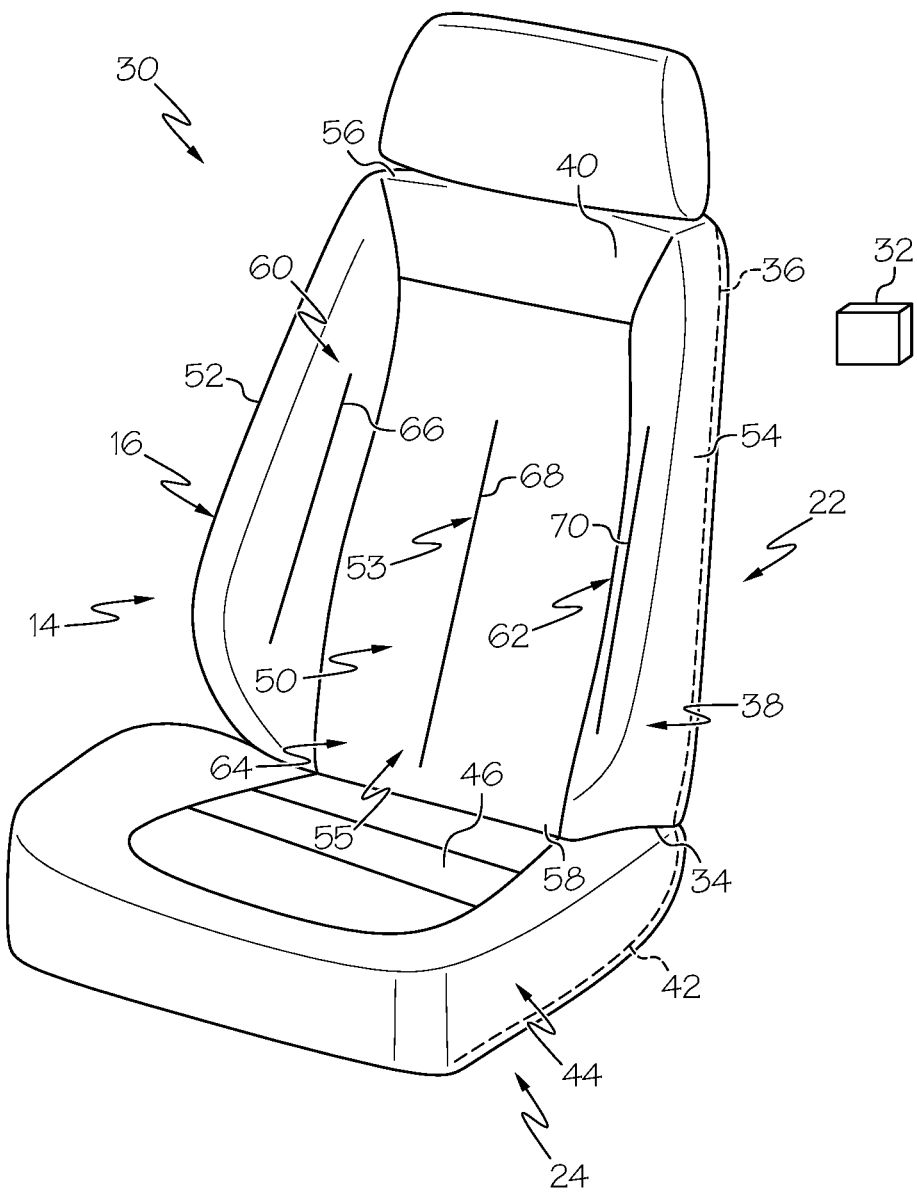
FIG. 2 is a schematic illustration of the occupant support system for use with the vehicle of FIG. 1, according to one or more embodiments shown and described herein.

Referring to FIG. 2, an occupant support system 30 includes the vehicle seat assembly 14 including the vehicle seat 16 and a seat ECU 32. The vehicle seat 16 includes the seat back structure 22 that is movably connected to the seat base structure 24 at a pivot location 34. The seat back structure 22 may include a seat back frame 36 and a padding structure 38 that is attached to the seat back frame 36. A cover 40 may cover the padding structure 38 and/or the seat back frame 36. Likewise, the seat base structure 24 may include a seat base frame 42 and a padding structure 44 that is attached to the seat base frame 42. A cover 46 may cover the padding structure 38 and/or the seat base frame 42.

The seat back structure 22 includes a number of adjustable regions that can be adjusted using the seat ECU 32. In particular, the seat back structure 22 includes a central adjustable region 50 that is located between sides 52 and 54, top 56 and bottom 58 of the seat back structure 22, an inboard side adjustable region 60 located at the side 54 of the seat back structure 22, an outboard side adjustable region 62 located at side 52 of the seat back structure 22 and a lower central adjustable region 64 located at the bottom 58 of the seat back structure 22 below the central adjustable region 50. While the central adjustable region 50, inboard side adjustable region 60, outboard side adjustable region 62 and lower central adjustable region 64 are illustrated, there may be other adjustable regions, such as an upper central adjustable region above the central adjustable region 50.

The central adjustable region 50 may generally be a relatively planar region that extends side-to-side in the vehicle lateral direction. In some embodiments, the central adjustable region 50 may include one or more contoured segments 53 and 55. For example, a lower contoured segment 55 may be associated with a lower and/or middle, central back or lumbar region of the occupant back and an upper contoured segment 54 may be associated with an upper, central back, neck and shoulder region of the occupant back. The upper contoured segment 53 may extend at a slight angle to the lower contoured segment 55, depending on the design of the seat back structure 22.

The inboard side adjustable region 60 extends inboard from the central adjustable region 50 in the vehicle lateral direction. In some embodiments, the inboard side adjustable region 60 may generally extend at an angle to the central adjustable region to extend in both the vehicle lateral and vehicle forward directions. The outboard side adjustable region 62 extends outboard from the central adjustable region 50 in the vehicle lateral direction. In some embodiments, the outboard side adjustable region 62 may generally extend at an angle to the central adjustable region to extend in both the vehicle lateral and vehicle forward directions.

As indicated above, a number of proximity sensors may be positioned on the seat back structure to provide an indication of associated occupant back locations with the occupant sitting in the vehicle seat 16. The proximity sensors may include one or more inboard side proximity sensors represented by line 66, one or more central proximity sensors represented by line 68 and one or more outboard side proximity sensors represented by line 70. The proximity sensors may be located along their respective lines 66, 68 and 70 and/or proximity sensors may be placed at other suitable locations; however, the lines 66, 68 and 70 may represent the general sensing locations of the proximity sensors.

The inboard side proximity sensors 66 may be located at the inboard side adjustable region 60. The inboard side proximity sensors 66 may be used to sense right back locations, such as involving the Latissimus Dorsi, Teres Major and Teres Minor areas of the right side of the occupant back. Similarly, the outboard side proximity sensors 70 may be located at the outboard side adjustable region 62. The outboard side proximity sensors 70 may be used to sense left back locations, such as involving the Latissimus Dorsi, Teres Major and Teres Minor areas of the left side of the occupant back. The central proximity sensors 68 may be located at the central adjustable region 50, and may be located at any one or more of the contoured segments 53 and 55. The central proximity sensors 68 may be used to sense central back locations, such as lumbar and Latissimus Dorsi regions.

Figure 3:
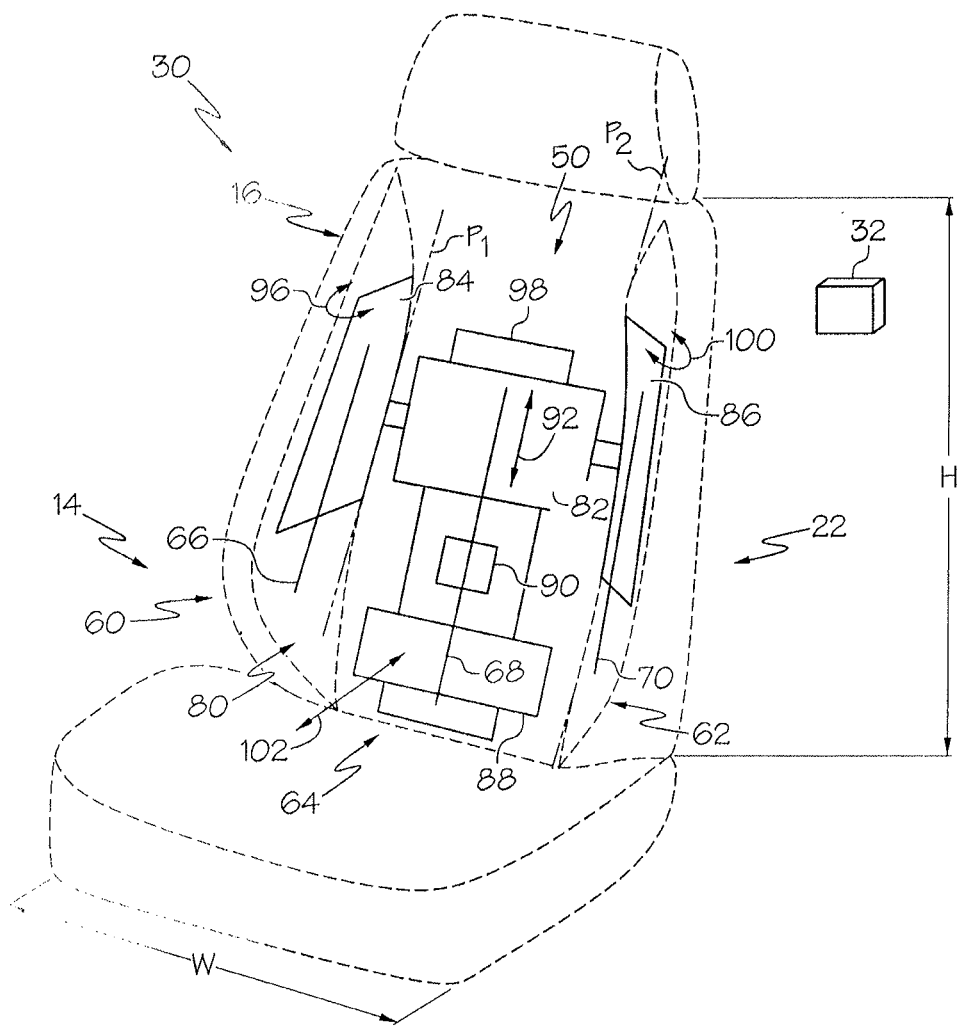
FIG. 3 is another schematic illustration of the occupant support system of FIG. 2, according to one or more embodiments shown and described herein.

FIG. 3 schematically illustrates the occupant support system 30 including the vehicle seat assembly 14 (with the vehicle seat 16 shown in dotted lines) and the seat ECU 32. The seat ECU 32 is communicatively coupled to the inboard side proximity sensors 66, the outboard side proximity sensors 70 and the central proximity sensors 68. As indicated above, the inboard side proximity sensors 66, the outboard side proximity sensors 70 and the central proximity sensors 68 provide a signal to the seat ECU 32 that is indicative of a location of respective locations of the occupant back. In response, the seat ECU 32 includes machine-readable instructions saved in memory that provide logic for controlling a seat back structure adjustment apparatus 80 in response to the signals from the inboard side proximity sensors 66, the outboard side proximity sensors 70 and the central proximity sensors 68.

The seat back structure adjustment apparatus 80 includes a number of adjustable members that can be used by the seat ECU 32 to adjust positions of the central adjustable region 50, the inboard side adjustable region 60, the outboard side adjustable region 62 and the lower central adjustable region 64 based on signals from the inboard side proximity sensors 66, the outboard side proximity sensors 70 and the central proximity sensors 68. In particular, the seat back structure adjustment apparatus 80 includes a central region adjustable member 82, an inboard side adjustable member 84, an outboard side adjustable member 86 and a lower central adjustable member 88. One or more actuators (e.g., motors), represented by element 90, may be connected to the central region adjustable member 82, the inboard side adjustable member 84, the outboard side adjustable member 86 and the lower central adjustable member 88 to allow selectable adjustment thereof, controlled by the seat ECU 32. For example, element 90 may represent multiple motors, including a separate motor for each of the central region adjustable member 82, the inboard side adjustable member 84, the outboard side adjustable member 86 and the lower central adjustable member 88.

The central region adjustable member 82 can be controlled by the motor 90 and seat ECU 32 to move generally in a vehicle vertical direction, in the direction of arrows 92, along a height H of the seat back structure 22. The central region adjustable member 82 can provide an adjustable lumbar support that allows for a height adjustment of a portion of the seat back structure 22 along the height H of the seat back structure 22. For example, the central adjustable member 82 may provide the seat back structure 22 with a predetermined stiffness and/or bulge in the central adjustable region 50 of the seat back structure 22. The central region adjustable member 82 may include padding, such as a foam or other suitable material that provides a stiffness that can be different than the stiffness of the padding structure 38 alone (FIG. 2).

The inboard side region adjustable member 84 can be controlled by the motor 90 and seat ECU 32 to move generally in a vehicle lateral direction, in the direction of arrows 96, in a side-to-side motion. In some embodiments, the seat back structure adjustment apparatus 80 may have a frame 98 that provides a generally vertical pivot axis $P_1$ that allows for pivoting of the inboard side adjustable member 84 relative to the central adjustable member 82. The inboard side region adjustable member 84 can provide an adjustable side support that allows for a width W adjustment the seat back structure 22 between the inboard side adjustable region 60 and the outboard side adjustable region 62. In particular, pivoting of the inboard side adjustable member 84 can change an angle between the inboard side adjustable member 84 and the central adjustable member 82. The inboard side adjustable member 84 may provide the seat back structure 22 with an adjustable side support that engages a right side of the occupant back. The inboard side region adjustable member 84 may include padding, such as a foam or other suitable material that provides a stiffness that can be different than the stiffness of the padding structure 38 alone (FIG. 2).

Similarly, the outboard side region adjustable member 86 can be controlled by the motor 90 and seat ECU 32 to move generally in a vehicle lateral direction, in the direction of arrows 100, in a side-to-side motion. In some embodiments, the seat back structure adjustment apparatus 80 may have the frame 98 that provides a generally vertical pivot axis $P_2$ that allows for pivoting of the outboard side adjustable member 86 relative to the central adjustable member 82. The outboard side region adjustable member 86 can provide an adjustable side support that allows for width W adjustment the seat back structure 22 between the outboard side adjustable region 62 and the inboard side adjustable region 60. In particular, pivoting of the outboard side adjustable member 86 can change an angle between the outboard side adjustable member 86 and the central adjustable member 82. The outboard side adjustable member 86 may provide the seat back structure 22 with an adjustable side support that engages a left side of the occupant back. The outboard side region adjustable member 86 may include padding, such as a foam or other suitable material that provides a stiffness that can be different than the stiffness of the padding structure 38 alone (FIG. 2).

The lower central adjustable member 88 can be controlled by the motor 90 and seat ECU 32 to move generally in a vehicle longitudinal direction, in the direction of arrows 102, in a front-to-back motion (between extended and retracted positions). In some embodiments, the seat back structure adjustment apparatus 80 may have the frame 98 that allows for movement of the lower central adjustable member 88 relative to the central adjustable member 82. The lower central adjustable member 88 can provide an adjustable lower back support that allows for length L adjustment the seat back structure 22 toward and away from the occupant back. The lower central adjustable member 88 may provide the seat back structure 22 with an adjustable lower back support that engages a lower portion of the occupant back, near hips of the occupant. The lower central adjustable member 88 may include padding, such as a foam or other suitable material that provides a stiffness that can be different than the stiffness of the padding structure 38 alone (FIG. 2).

Figure 4:
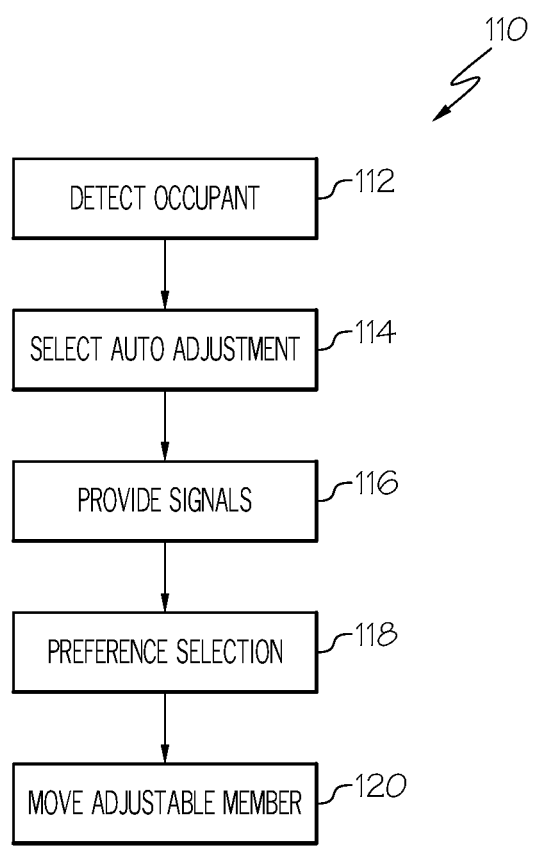
FIG. 4 illustrates a method of automatically adjusting a seat back structure of a vehicle seat, according to one or more embodiments shown and described herein.

Referring to FIG. 4, a method 110 of automatically adjusting a seat back structure 22 of a vehicle seat 16 is provided. The method 110 includes detecting an occupant sitting in the vehicle seat 16 at step 112. Any suitable method for detecting the occupant sitting in the vehicle seat 16 may be used, such as using one or more of the inboard side proximity sensors 66, the outboard side proximity sensors 70 and the central proximity sensors 68, or using a different sensor, such as a camera or other suitable device. At step 114, the occupant may select an "Auto Lumbar," which can begin an automatic seat adjustment process. The occupant may make the selection using any suitable user input, such as provided by a console display, head unit and/or a button or switch provided on a vehicle dash, steering wheel, center console, etc. At step 116, each of the inboard side proximity sensors 66, the outboard side proximity sensors 70 and the central proximity sensors 68 provide a signal to the seat ECU 32. The signals may be accompanied with an identifier that identifies location of the inboard side proximity sensors 66, the outboard side proximity sensors 70 and the central proximity sensors 68 to the seat ECU 32.

In some embodiments, the occupant may make a preference selection using the user input at step 118. For example, a first preference selection may be a "normal" customizable feature that provides a first seat configuration, a second preference selection may be a "comfort" customizable feature that provides a second seat configuration that is different from the first seat configuration and a third seat configuration that may be a "sport" customizable feature that provides a third seat configuration that is different than the first and second seat configurations. The preference selected by the occupant may set seat ECU conditions by which the seat ECU controls operation of the seat back structure adjustment apparatus 80.

Figure 5A:
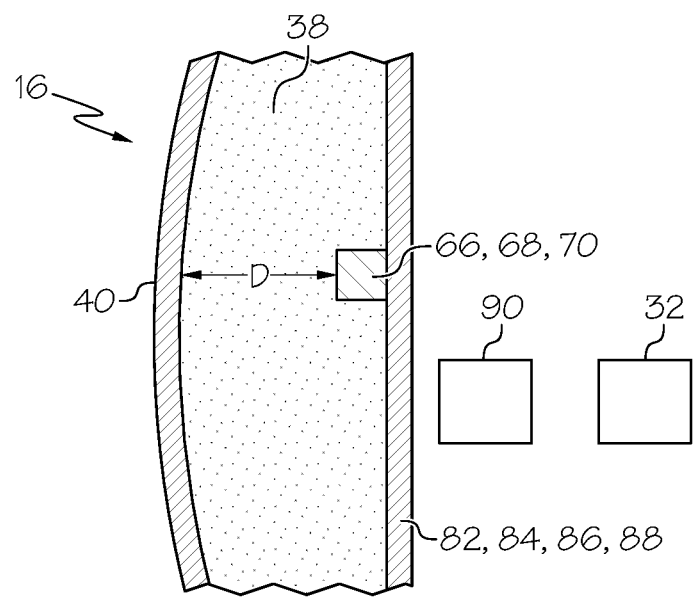
FIG. 5A is a schematic illustration of a vehicle seat assembly in an unloaded condition, according to one or more embodiments shown and described herein.
Figure 5B:
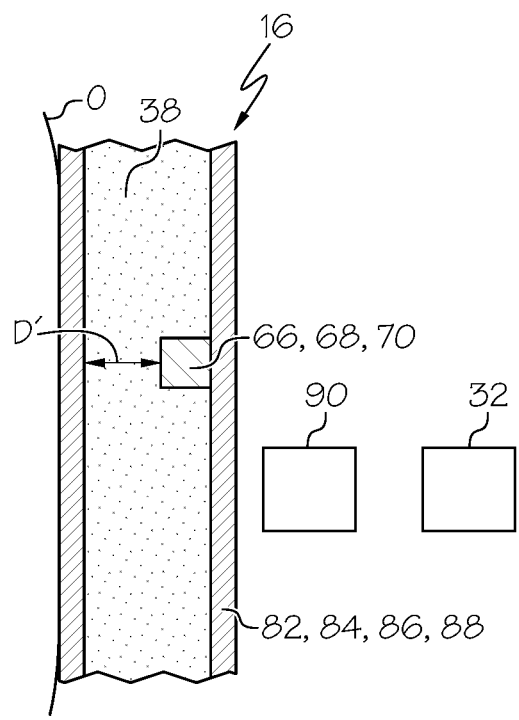
FIG. 5B is a schematic illustration of the vehicle seat assembly of FIG. 5A in a loaded configuration.

Referring briefly to FIGS. 5A and 5B, the inboard side proximity sensors 66, the outboard side proximity sensors 70 and the central proximity sensors 68 may be located a predetermined distance from the cover 40, which covers the padding structure 38, with the vehicle seat 16 in an unloaded condition (i.e., without an occupant) as illustrated by FIG. 5A. When the occupant O sits in the vehicle seat 16, the padding structure deflects toward the inboard side proximity sensors 66, the outboard side proximity sensors 70 and the central proximity sensors 68, thereby reducing a distance D to a distance D'. The inboard side proximity sensors 66, the outboard side proximity sensors 70 and the central proximity sensors 68 then can provide a signal to the seat ECU 32 that is indicative of D'. If the seat ECU 32, using its processor, determines that D' is greater than a predetermined amount saved in memory, the seat ECU 32 may adjust (i.e., move) the associated central region adjustable member 82, the inboard side adjustable member 84, the outboard side adjustable member 86 and the lower central adjustable member 88 toward the occupant back B using the actuator 90 until D' is at or within a predetermined range of the predetermined distance. Likewise, if the seat ECU 32 determines that D' is less than a predetermined amount, the seat ECU 32 may adjust the associated central region adjustable member 82, the inboard side adjustable member 84, the outboard side adjustable member 86 and the lower central adjustable member 88 away from the occupant back B using the actuator 90 until D' is at or within the predetermined range of the predetermined distance. Each of the inboard side proximity sensors 66, the outboard side proximity sensors 70 and the central proximity sensors 68 may have their own predetermined distances D'.

The preference selections described above can be used to set the predetermined distance for controlling one or more of the central region adjustable member 82, the inboard side adjustable member 84, the outboard side adjustable member 86 and the lower central adjustable member 88. The normal mode, for example, may set one or more predetermined distances D' to a first set of values, which may be considered a baseline set of values. The other preference selections may change one or more of the predetermined distances D' from the normal mode. For example, the comfort mode may set one or more of the predetermined distances D' to a farther distance. The sport mode may reduce one or more of the predetermined distances D', such as the predetermined distances D' of the inboard and outboard side proximity sensors 66 and 70.

Referring back to FIG. 4, based on the preference selection, the seat ECU 32 may cause the seat back structure adjustment apparatus 80 to adjust one of more of the central region adjustable member 82, the inboard side adjustable member 84, the outboard side adjustable member 86 and the lower central adjustable member 88 based on input from the inboard side proximity sensors 66, the outboard side proximity sensors 70 and the central proximity sensors 68 at step 120. The method 110 may repeat occasionally to update the seat back structure adjustment apparatus 80 or upon a new preference selection. A customized preference may also be created and saved in memory of the seat ECU 32.

While distance-type proximity sensors are described above other types of proximity sensors may be used. As used herein, a proximity sensor refers to any type of sensor that can be used to provide an indication of distance. For example, a weight or load sensor may be used as a proximity sensor and one or more predetermined weights or loads may be used.

The above-described occupant support systems including vehicle seat assembly with seat back structure apparatus and proximity sensors can allow for automatic adjustment of various adjustable regions of seat back structures based on occupant preferences. The occupant support systems can be used with other vehicle systems, such as a smart key system to set occupant preferences for a particular vehicle occupant based on a smart key signal (e.g., from a key fob). The adjustable members of the seat back structure adjustment apparatus may be independently adjustable based on input from the various proximity sensors. Such an adjustable seat back arrangement can provide a luxury convenience feature to the occupant.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle seat comprising a seat base structure and a seat back structure pivotally connected to the seat base structure, the seat back structure including a central adjustable region, an inboard side adjustable region adjacent the central adjustable region and an outboard side adjustable region located adjacent the central adjustable region, wherein the seat back structure includes a central proximity sensor located at the central adjustable region, an inboard side proximity sensor located at the inboard side adjustable region and an outboard side proximity sensor located at the outboard side adjustable region;
a seat ECU that receives signals from the central proximity sensor, the inboard side proximity sensor and the outboard side proximity sensor that are indicative of respective occupant back locations with an occupant sitting in the vehicle seat; and
a seat back structure adjustment apparatus comprising a central region adjustable member that adjusts a configuration of the central adjustable region, an inboard side adjustable member that adjusts a configuration of the inboard side adjustable region and an outboard side adjustable member that adjusts a configuration of the outboard adjustable region;
wherein the seat ECU includes logic for controlling an actuator that moves one or more of the central region adjustable member, the inboard side adjustable member and the outboard side adjustable member based on one or more signals from the central proximity sensor, the inboard side proximity sensor and the outboard side proximity sensor;

wherein the inboard side adjustable member pivots relative to the central adjustable member to move the inboard adjustable region toward the outboard adjustable region;

wherein the outboard adjustable member pivots relative to the central adjustable member to move the outboard adjustable region toward the inboard adjustable region; and wherein the central adjustable member moves along a height of the seat back structure in a vehicle vertical direction to provide the seat back structure with an adjustable predetermined stiffness and/or bulge in the central adjustable region;

wherein the seat ECU moves the central region adjustable member, the inboard side adjustable member and the outboard side adjustable member to within one or more predetermined distances of respective occupant back locations based on the signals from the central proximity sensor, the inboard side proximity sensor and the outboard side proximity sensor.

2. The vehicle of claim 1, wherein the seat back structure further includes a lower central adjustable region located below the central adjustable region, the seat back structure adjustment apparatus comprising a lower central adjustable member that adjusts a configuration of the lower central adjustable region.

3. The vehicle of claim 2, wherein the seat ECU controls the actuator that moves the lower central adjustable member based on the one or more signals from one or more of the central proximity sensor, the inboard side proximity sensor and the outboard side proximity sensor.

4. The vehicle of claim 3, wherein the lower central adjustable member is moveable forward and rearward in a vehicle longitudinal direction.

5. The vehicle of claim 1, wherein the one or more predetermined distances are selectable based on occupant input.

6. A method of automatically adjusting a seat back structure of a vehicle seat, the method comprising:

detecting occupant back locations using an inboard proximity sensor, an outboard proximity sensor and a central proximity sensor provided on the seat back structure of the vehicle seat, the sensors providing one or more signals indicative of the occupant back locations to a seat ECU;

the seat ECU determining if the occupant back locations are within one or more predetermined distances; and the seat ECU adjusting a configuration of at least one of a central adjustable region, an inboard side adjustable region and an outboard side adjustable region of the seat back structure by moving at least one of a central region adjustable member, an inboard side adjustable member and an outboard side adjustable member using an actuator based on the one or more signals from the central proximity sensor, the inboard proximity sensor and the outboard proximity sensor and the one or more predetermined distances;

wherein the one or more signals from the central proximity sensor, the inboard proximity sensor and the outboard proximity sensor are indicative of a distance from the respective central proximity sensor, the inboard proximity sensor and the outboard proximity sensor to a cover of the seat back structure;

wherein the seat ECU moves the central region adjustable member, the inboard side adjustable member and the outboard side adjustable member to within one or more predetermined distances of respective occupant back locations based on the signals from the central proximity sensor, the inboard side proximity sensor and the outboard side proximity sensor.

7. The method of claim 6 further comprising the seat ECU adjusting a configuration of a lower central adjustable region of the seat back structure located below the central adjustable region by moving a lower central adjustable member of the seat back structure adjustment apparatus using the actuator based on the one or more signals from one or more of the central proximity sensor, the inboard side proximity sensor and the outboard side proximity sensor.

8. The method of claim 7, wherein the lower central adjustable member is moveable forward and rearward in a vehicle longitudinal direction.

9. The method of claim 6, wherein the inboard side adjustable member pivots relative to the central adjustable member to move the inboard adjustable region toward the outboard adjustable region.

10. The method of claim 6, wherein the outboard adjustable member pivots relative to the central adjustable member to move the outboard adjustable region toward the inboard adjustable region.

11. The method of claim 6, wherein the central adjustable member moves along a height of the seat back structure in a vehicle vertical direction.

12. The method of claim 6, providing the seat ECU with multiple preference selections that are selectable by an occupant, wherein the preference selections determine the one or more preselected distances.

13. A vehicle seat assembly comprising:

a vehicle seat comprising a seat base structure and a seat back structure pivotally connected to the seat base structure, the seat back structure including a central adjustable region, an inboard side adjustable region adjacent the central adjustable region and an outboard side adjustable region located adjacent the central adjustable region, wherein the seat back structure includes a central proximity sensor located at the central adjustable region, an inboard side proximity sensor located at the inboard side adjustable region and an outboard side proximity sensor located at the outboard side adjustable region; and a seat back structure adjustment apparatus located in the seat back structure comprising a central region adjustable member that adjusts a configuration of the central adjustable region, an inboard side adjustable member that adjusts a configuration of the inboard side adjustable region and an outboard side adjustable member that adjusts a configuration of the outboard adjustable region;

wherein the seat back structure further includes a lower central adjustable region located below the central adjustable region, the seat back structure adjustment apparatus comprising a lower central adjustable member that adjusts a configuration of the lower central adjustable region;

wherein the central adjustable member moves along a height of the seat back structure in a vehicle vertical direction to provide the seat back structure with an adjustable predetermined stiffness and/or bulge in the central adjustable region;

wherein a seat ECU moves the central region adjustable member, the inboard side adjustable member and the outboard side adjustable member to within one or more predetermined distances of respective occupant back locations based on signals from the central proximity sensor, the inboard side proximity sensor and the outboard side proximity sensor.

14. The vehicle seat assembly of claim 13, wherein the lower central adjustable member is moveable forward and rearward in a vehicle longitudinal direction.

15. The vehicle seat assembly of claim 14, wherein the inboard side adjustable member pivots relative to the central adjustable member to move the inboard adjustable region toward the outboard adjustable region and the outboard side adjustable member pivots relative to the central adjustable member to move the outboard adjustable region toward the inboard adjustable region.

\* \* \* \* \*